United States Patent [19]

Schneckloth

[11] 4,406,434

[45] Sep. 27, 1983

[54] RECREATIONAL VEHICLE DRAIN SUPPORT

[76] Inventor: Raymond C. Schneckloth, Rte. 2, Clinton, Iowa 52732

[21] Appl. No.: 306,328

[22] Filed: Sep. 28, 1981

[51] Int. Cl.³ ............................................. A47G 29/00
[52] U.S. Cl. ..................................... 248/83; 248/49; 405/119
[58] Field of Search ...................... 248/83, 76, 85, 75, 248/49, 150, 188.6, 166, 435, 316 D, 352, 526; 292/60, 62, 153, 55, 163; 403/353, 363; 405/118, 119, 120, 121, 122, 123

[56] References Cited

U.S. PATENT DOCUMENTS

| | | | |
|---|---|---|---|
| 411,846 | 10/1889 | Webber | 292/55 |
| 539,797 | 5/1895 | Collins | 405/119 X |
| 2,161,239 | 6/1939 | Thomson | 403/363 |
| 2,166,916 | 7/1939 | Lombard | 248/316 D X |
| 2,673,059 | 3/1954 | Lustig | 248/316 D |
| 2,697,574 | 12/1954 | Bricker | 248/150 X |
| 3,030,031 | 4/1962 | Barker | 248/85 X |
| 3,900,269 | 8/1975 | Pavlot | 403/363 X |
| 4,033,552 | 7/1977 | Kuzarov | 403/353 X |
| 4,225,265 | 9/1980 | Hooker et al. | 403/353 |
| 4,228,978 | 10/1980 | Rand | 248/75 X |

FOREIGN PATENT DOCUMENTS 320169 8/1934 Italy ..................................... 248/83

Primary Examiner—William E. Lyddane
Assistant Examiner—Ramon O. Ramirez
Attorney, Agent, or Firm—Glenn H. Antrim

[57] ABSTRACT

A flexible sewer hose is supported in a trough made of rigid sections. Pairs of supporting members are tied together by resilient means to provide an upper diverging clamping portion and a lower pair of diverging legs. The upper clamping portion securely fastens the legs to the trough and when the clamping portion is positioned about overlapping sections of trough, securely holds the sections together to function as a single trough. The supporting members are easily attached by snapping upper inwardly turned ends over upper edges of the trough, are easily disassembled, and fit together for compact storage.

3 Claims, 4 Drawing Figures

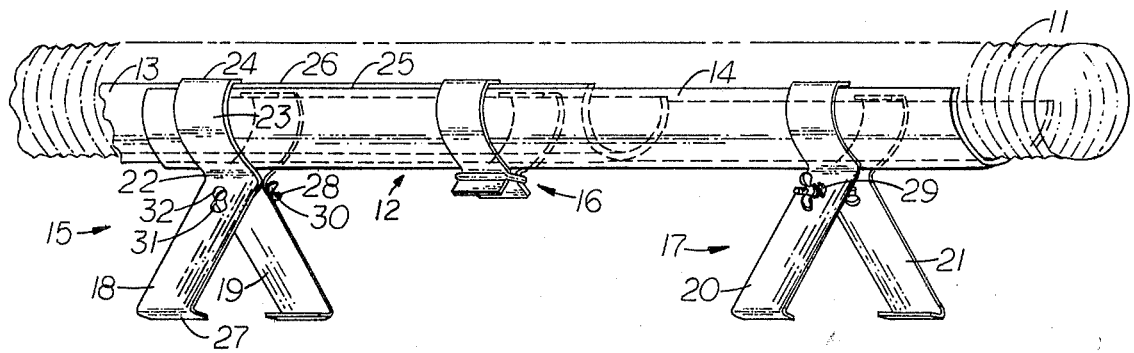
FIG. 1
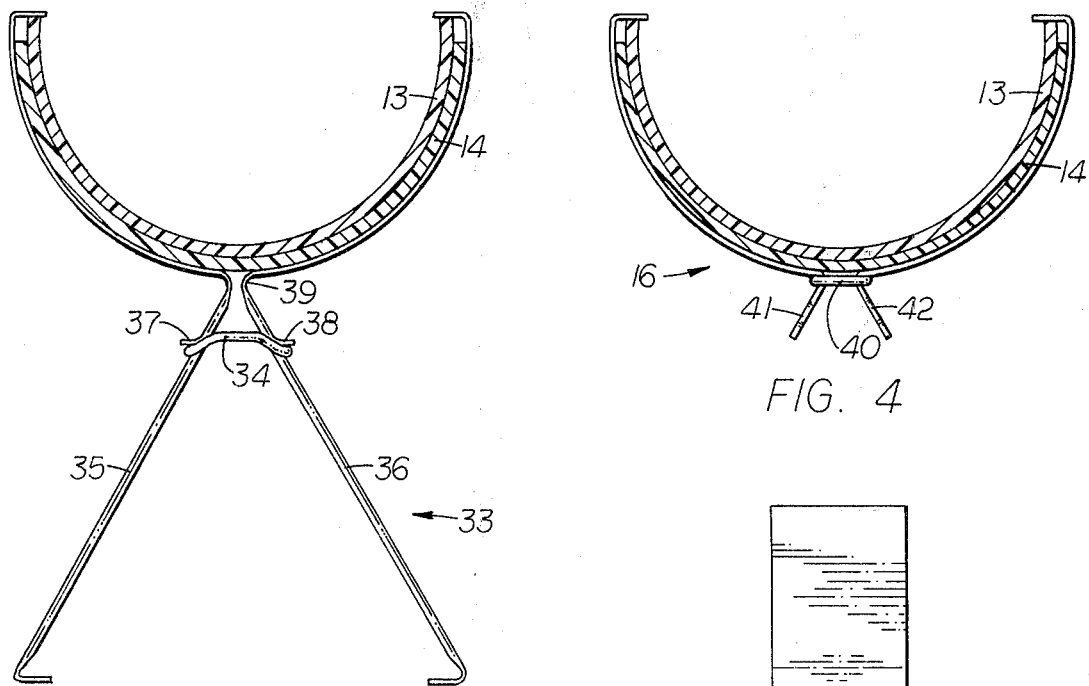
FIG. 2
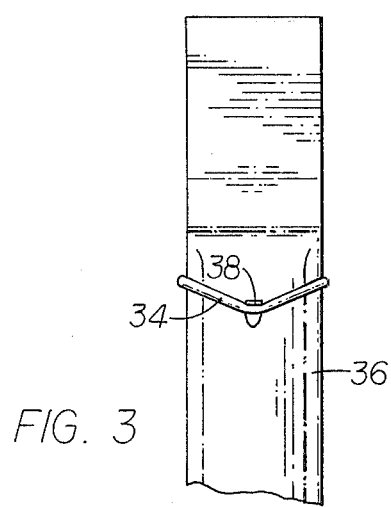
FIG. 3
FIG. 4

RECREATIONAL VEHICLE DRAIN SUPPORT

BACKGROUND OF THE INVENTION

This invention relates to rigid supports for flexible sewer hoses that are connected to waste holding tanks of recreational vehicles, and particularly to supports having members held together by resilient means to function both as clamps for holding sections of troughs together and as legs for supporting the troughs.

Both telescoping tubes and joined pieces of open trough have been used to support flexible sewer hoses temporarily connected from waste holding tanks of recreational vehicles to nearby sewer drains. The supports must be quite rigid, and be supported either by legs or by ties to slope downwardly from the recreational vehicles. When tubular supports are used, the different sections are telescoped to fit within rectangular bumpers of the recreational vehicles, and when sections of trough with overlapping ends are used, the sections are disassembled and then nested together before storage. Often legs are used below the supporting tubes or the troughs, and any legs that are used may be disassembled and fit together to be placed inside the tubes or the troughs, or the legs may be folded along the sides of a trough to which the legs are pivotally connected. For storage, the flexible sewer hose is compressed in an accordian manner. The sections of troughs usually have separate clamping means to be tightened for holding the overlapping ends of the sections together.

SUMMARY OF THE INVENTION

According to the present invention, pieces of rigid, simicircular sections of trough are fit together with ends overlapping to be used as a single trough. Pairs of supporting members are spaced along the trough to function both as clamping means to hold the sections of trough together and to support the trough along a desired sloping line above the ground.

Each of the members for supporting the trough has an intermediate bend such that when the member is positioned for use, an upward clamping portion above the bend diverges outwardly along the surface of the trough, and a lower portion is a leg extending outwardly and downwardly from the bend. A pair of clamping portions above the bends of the supporting members is generally shaped to conform with the outer surface of the trough, and the upper ends of the clamping portions are turned inwardly for a sufficient distance to pass over the upper edges of a section of trough, or where the sections overlap, the edges of both overlapping portions. Resilient interconnecting means at or near the bends press the inwardly turned, upper ends against the upper edges of the trough or the upper edges of an inner overlapping portion of trough and press the rest of the clamping portions against the outer surface of the trough, or of the outer surface of an outer overlapping portion. The trough spreads the bends somewhat apart, and the resilient interconnecting means urges the supporting members toward each other. Such a clamping arrangement permits the pairs of supporting members to be snapped very quickly about the concave portion of the trough, holds the sections of trough together rigidly, and positions the portions as legs securely below the trough. Usually, the lower ends of the legs extend outwardly beyond the respective sides of the trough and are preferably turned inwardly parallel with the ground to provide substantial contacting area.

One type of resilient interconnecting means uses a bolt that passes through holes somewhat below the bends of the supporting members and a spring positioned between one of the supporting members and one end of the bolt. Another type uses a rubber band that may be positioned either within the bend or preferably positioned below the bend and held in that position on the slanting legs by tabs projecting outwardly. When only the upper clamping portions are required for holding the overlapping ends of the trough together, the lower diverging portions rather than extending as legs may be terminated a short distance below the bend to provide tabs for retaining the resilient band. The legs of supporting members positioned near an outer end of a trough usually are shorter than the legs of supporting members positioned closer to the recreational vehicle.

BRIEF DESCRIPTION OF THE DRAWING

FIG. 1 is a perspective view of the side of the drain support according to this invention including supporting members attached to a trough;

FIG. 2 is a cross-sectional end view of overlapping portions of sections of a trough showing a different support having different resilient interconnecting means between its members;

FIG. 3 is a side view of the support of FIG. 2; and

FIG. 4 is a cross-sectional view of overlapping portions of the trough of FIG. 1 showing use of a clamp at a position where legs are not required.

DESCRIPTION OF THE PREFERRED EMBODIMENTS

In FIG. 1, an extended flexible sewer hose 11 is supported within a semi-circular trough comprising overlapping plastic sections 13 and 14. The overlapping ends of the sections 13 and 14 are clamped together by upper portions of a pair of supporting members 15 and by a clamp 16 and is held above the ground by the lower portions or legs of the pair of supporting members 15 and of an additional pair of supporting members 17. The pair of supporting members 17 being beyond the overlapping sections has upper portions clamped only to the outer section 14 of the trough 12. Since the supporting members 15 are positioned closer to the recreational vehicle, the legs 18 and 19 of the pair of supporting members 15 are preferably longer than the legs 20 and 21 of the supporting member 17.

In more detail, the shape of each of the members of the pair of supporting members 15 and 17 may be seen more clearly with respect to the members 15. An upper portion 23 and the leg 18 diverges outwardly from the lower portion of the trough 12 to form a bend 22. The upper portion 23 is a clamping portion that generally conforms with the outer surface of one side of the trough 12 and has an inwardly turned end 24 passing over the upper edge 25 of the section of trough 14 at the respective side such that the end 24 contacts the upper edge 26 of the overlapping end of the inner trough 13. The leg 18 diverges in a downward direction from the bend 22 and has an inwardly turned end or foot 27 to provide a substantial resting portion. The pair of members 15 are interconnected by a bolt 28 that extends through the members at a position slightly below their respective bends. Resiliency for urging the members of the pair 15 together is provided by a spring 29 (as more clearly shown with respect to the pair of members 17) between a wing nut 30 and one member of each of the members 15 and 17. Whereas the hole through the upper leg 19 of one of the members of the pair 15 is merely a round hole for receiving the shank of the bolt 28, the hole 31 through the upper end of the leg 18 of the other member has a shape of a key hole with a lower portion in a usual manner having a diameter slightly larger than a head 32 of the bolt 28 and an upper slotted portion having a width slightly greater than the diameter of the bolt so that the member having the leg 18 can be readily connected and disconnected from its mating member.

In FIG. 2, a pair of supporting members 33 are interconnected by a rubber ring or band 34 held 20 to 25 mm below a bend 39 by tabs 37 and 38 (FIG. 3) projecting outwardly from the outer surfaces of the legs 35 and 36 respectively. According to FIG. 4, the clamp 16 is similar to only the upper portion of the supporting members 33 of FIG. 2, has lower tabs 41 and 42 turned outwardly in place of the longer legs 35 and 36, and has a band 40 in a bend above the tabs.

The moderate force supplied by the spring 29 of FIG. 1 or the band 34 of FIG. 2 to urge the supporting members of the pairs 15, 17 or 33 together clamps the overlapping ends of the pieces 13 and 14 of the trough together very securely and firmly attaches the legs 18-21, 35 and 36 to the trough 12. To assemble the drain support after the pieces are removed from a bumper of a recreational vehicle, one member of each of the pairs of supporting members, such as the members 15, is turned around from its nesting position for transportation, and in event that the bolt 28 is used, the head 32 of the bolt is inserted through the hole 31 such that the members are connected together. Then an upper inwardly turned end 24 is hooked over the upper edges 25 and 26 of the overlapping troughs 14 and 13 respectively, and then the opposite member is grasped near the bend 22 and pulled outwardly against the tension of the spring 29 or the band 34 while the upper inwardly turned end opposite the end 24 is snapped up over the opposite edges of the overlapping sections 13 and 14. In a similar manner, members of the clamp 16 are snapped where required over the edges; in addition, supporting members 17 having legs of required length are snapped over single edges of the trough. For transportation, the procedure for disassembly is practically the reverse of the procedure for assembly such that the pieces can be nested together and returned to the bumper of the recreational vehicle.

I claim:

1. A support for a flexible drain hose comprising: a trough having a plurality of successive overlapping sections opening upwardly to define for receiving said hose an elongated cavity, each of said sections having respective opposite upper edges above respective opposite sides, said sections at each overlapping position having an inner end portion and an overlapping outer end portion and said upper edges of each of said inner end portions extending somewhat beyond said upper edges of said respective outer end portions, a plurality of pairs of supporting members, each member of each of said pairs having an upper clamping portion, a lower leg portion, and a bend at a substantial angle between said portions, elastic interconnecting means for each of said pairs for interconnecting said respective bends such that said legs diverge from said respective bends in a downward direction and said clamping portions diverge over said respective legs in an upward direction, said bends of each of said pairs being spaced apart somewhat below a lower longitudinal central line of said trough, each of said clamping portions having an inwardly turned upper end, said inwardly turned upper ends of said clamping portions of any of said pairs of supporting members at any of said overlapping positions extending over respective adjacent upper edges of both said inner and outer end portions of said respective joined sections but contacting said upper edges of only said inner portions of said respective sections, and each of said clamping portions having a side portion contacting said side of said outer portion adjacent thereto to clamp said respective sections of said trough together.

2. A support as claimed in claim 1 wherein a clamp is attached to said trough at least at one of said overlapping positions, said clamp having a pair of separate diverging portions extending generally vertically along said respective sides of said respective outer end portion, each of said diverging portions having an inwardly turned upper end extending over respective ones of said adjacent upper edges of both said respective inner and outer end portions but contacting only said upper edges of said respective inner end portion, said diverging portions of said clamp extending underneath said trough and bending outwardly in a downward direction underneath said lower central longitudinal line to form respective diverging tabs held somewhat apart by said trough, and resilient means connected between said diverging portions of said clamp approximate said central longitudinal line to urge said inwardly turned upper ends of said clamp against said respective adjacent upper edges of said respective inner end portion and said diverging portions of said clamp against said respective sides of said outer end portion to retain said respective sections of said trough together.

3. A support for a flexible drain hose comprising: a trough comprising a plurality of generally semicircular overlapping sections of trough, each position along said trough where successive ones of said sections overlap having an inner end portion of one of said sections overlapping and an outer end portion of the adjacent one of said sections, the upper edges of said inner end portions extending somewhat beyond the upper edges of said outer end portions, a clamp attached to said trough at a respective one of said positions of overlapping end portions, said clamp having a pair of separate diverging portions extending upwardly along respective sides of said outer end portion at said one position, each of said diverging portions having an inwardly turned upper end over upper edges of respective ones of said outer and inner end portions, said diverging portions of said clamp underneath said trough bending outwardly in a downward direction to form respective bends and respective diverging tabs both held somewhat apart by a respective one of said outer end portions, and elastic interconnecting means connected between said diverging portions approximate said bends to urge said diverging portions together for pressing said inwardly turned upper ends against said respective edges of only said one inner end portion and said diverging portions against at least lower portions of respective sides of said respective outer end portion for retaining said sections of trough together.

* * * * *